Jan. 1, 1935.  E. A. MARSKI  1,986,066
AIRPLANE
Filed Dec. 18, 1933  2 Sheets-Sheet 1
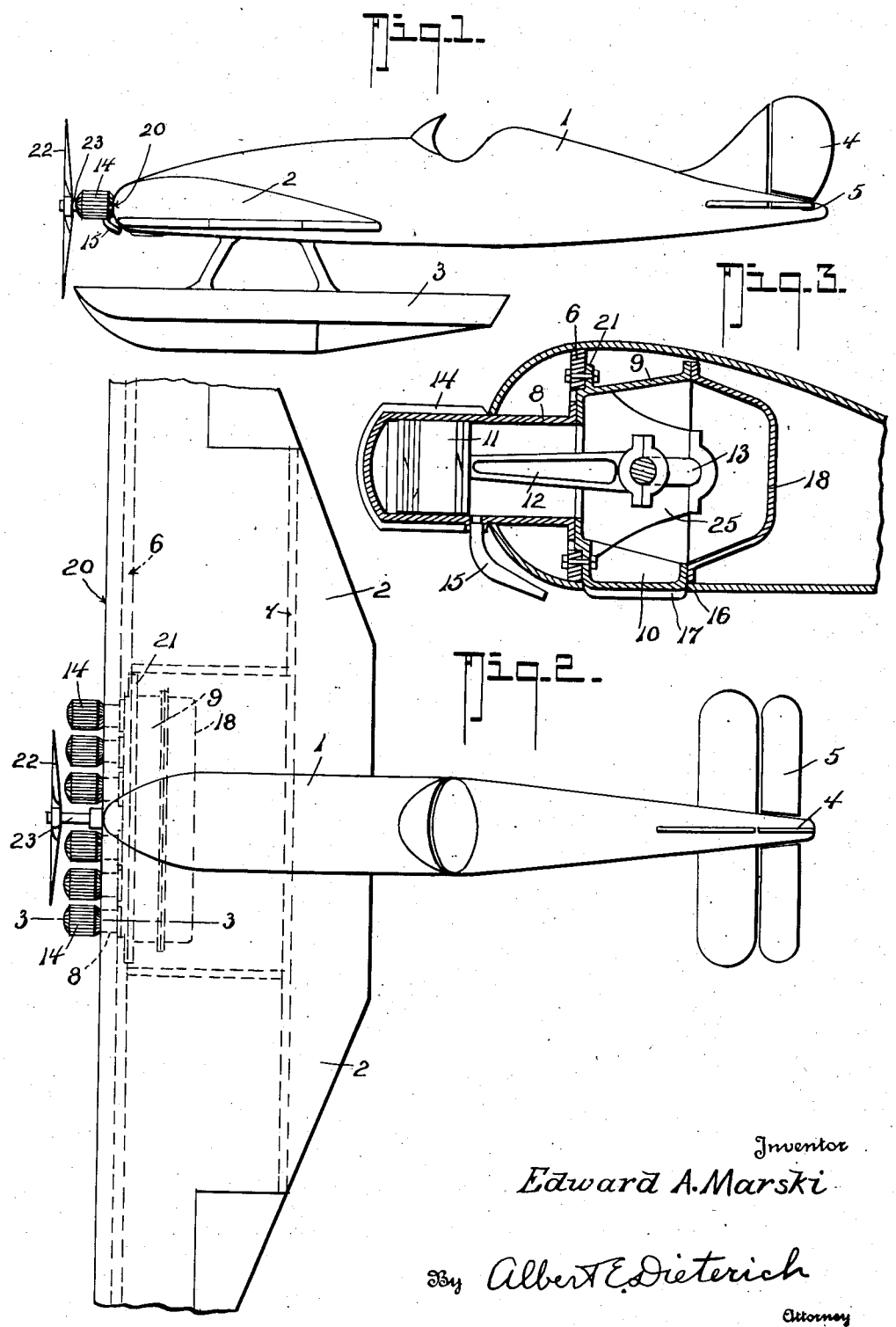
Inventor
Edward A. Marski
By Albert E. Dieterich
Attorney

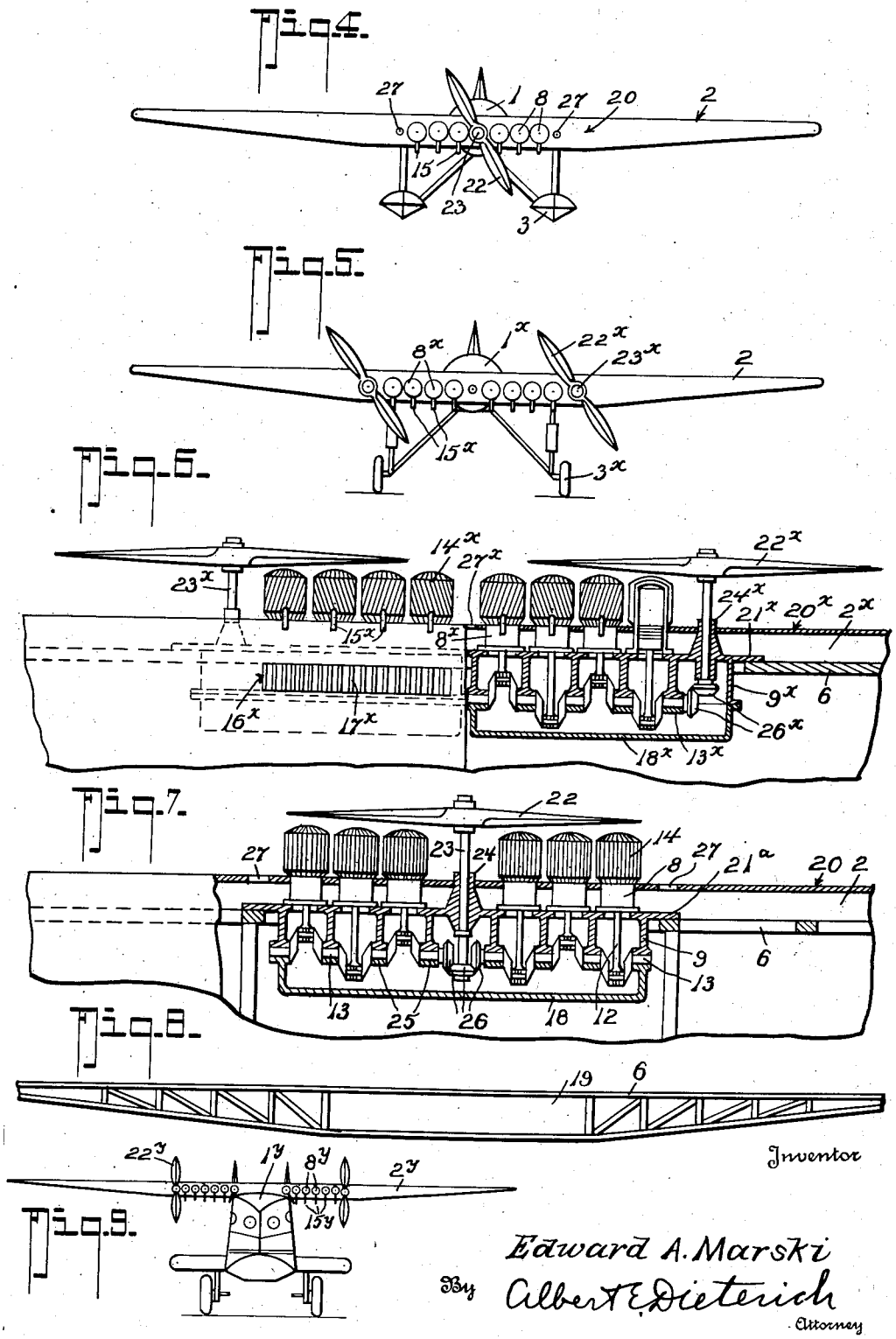

Patented Jan. 1, 1935

1,986,066

UNITED STATES PATENT OFFICE 1,986,066

AIRPLANE

Edward A. Marski, Phoenix, Ariz.

Application December 18, 1933, Serial No. 703,010

12 Claims. (Cl. 244—31)

The invention relates to improvements in airplanes which are driven by one or several air cooled internal combustion engines. Heretofore, these engines have usually been placed with their cylinder axis at right angle to the direction of flight. This arrangement involves a comparatively large resistance to the air motion, resulting in a diminishment of the performance of the airplane. It results further in uneven and wasteful cooling, uneven because different sides of the cylinders are cooled, different and wasteful because the cooling is not most concentrated at the hottest parts of the cylinder. Finally, the engine thus arranged obstructs the vision of the pilot.

The purpose of the present invention is to provide an airplane driven by one or several air cooled internal combustion engines, with superior performance, more compact arrangement with small frontal area, thus reducing large head resistance and drag, with even and economical cooling of the engine cylinders most intense at the hottest part thereof, also affording superior visibility in the most important direction. This purpose is obtained by placing the air cooled cylinders parallel to the direction of flight, and shielded by the front portion of the wings so that the cylinder heads project from the leading edge of the wing and are most directly and economically exposed to the cooling air. These cylinder heads which are the hottest parts of the engine, receive that way the best cooling by virtue of the described arrangement. The cooling is further even around the cylinders and the air resistance is reduced to a small value. The obstruction of the vision is greatly reduced.

It is, therefore, one object of the present invention to provide an airplane of such kind, with the engine cylinders shielded by the streamlined air-foil or wing surfaces, their heads projecting from the leading edge of the air-foil or wing facing the direction of flight.

Still another object of the invention is to provide for an airplane driven by one or several air cooled internal combustion engines comprising cylinders arranged with their axis substantially parallel to the direction of flight, shielded by a streamlined surface, the cylinder head projecting therefrom in front being directly exposed to the cooling air.

Further, it is an object to provide an airplane power plant so associated with the wing or air-foil that (when metal sheathed wings are employed) the heat conductivity of the wing skin is utilized to aid the cooling of the working cylinders of the engine by contact-conduction.

Further it is an object to provide a power plant wing or air-foil combination which does away with large area of air cooled engine exposed to the air stream and causing head resistance, and by my invention reduces the head resistance and hence enables an increase in speed and an improved climbing ability.

These and other desirable objects and advantages of the present invention will be illustrated in the accompanying drawings and described in the specification, certain preferred embodiments being described by way of illustration only, for, since the underlying principles may be incorporated in other specific devices, it is not intended to be limited to the ones here shown except as such limitations are clearly imposed in the appended claims.

In the drawings:

Figure 1 is a side elevation of an airplane embodying my invention.

Figure 2 is a plan view of the same, parts being broken away.

Figure 3 is an enlarged detail vertical longitudinal section on the line 3—3 of Figure 2.

Figure 4 is a front elevation of the structure shown in Figures 1 and 2.

Figure 5 is a front elevation of a modification using two propellers and two engine units or one large unit.

Figure 6 is a detail inverted plan view and part horizontal section of the embodiment of the invention shown in Figure 5.

Figure 7 is a detail horizontal section and part top plan view of the embodiment shown in Figure 2.

Figure 8 is a front elevation, parts being broken away, of the front spar showing the space for the reception of the engine.

Figure 9 is a front elevation of a modification in which the wings extend from the sides of a cabin fuselage.

In the drawings, in which like numerals indicate like parts in all the figures, 1 represents the body or fuselage and 2 the wing or air-foil structure, while 3 indicates the landing gear, 4 the steering rudder and 5 the elevating rudders, all of which parts may be of the conventional and usual construction.

In the wing construction, however, there is usually provided a set of spars running transversely of the cabinet (longitudinally of the spread of the wing) there being a front spar 6 and additional spars 7 toward the rear of the wing.

In carrying out my invention the front spar is constructed to provide a rectangular opening 19 into which the engine unit or units may be set and this spar 6 serves as the bed or support to which the engine crank case is bolted. This may be done by providing the crank case 9 with a flange 21 (Figure 3) or 21a (Figure 7) to bolt either on the rear or front face of the spar, as may be found most convenient to the airplane designer. The engine cylinders 8 have that portion of the same which encloses the working chamber projected through the front or leading edge 20 of the wing or air-foil and the projected portion is provided with suitable longitudinally directed cooling fins 14 which may extend parallel to the axes of the cylinders (see Figures 1 to 3, inclusive, and Figure 7) or they may run longitudinally in a spiral screw-like direction (see Figure 6) as desired.

The engine cylinders carry the usual pistons 11 whose rods 12 connect with the crank shaft 13 that is journaled in suitable bearing members 25. The base of the engine 9 carries the usual pan 18 and it is preferably formed with an oil reservoir that projects through an opening 16 in the lower face of the air-foil (serving also as a closure for that opening) so as to be exposed to the air stream beneath the air-foil and thereby cool the oil in the engine, there being cooling fins or ribs 17 provided, if desired.

The exhaust pipes 15 from the cylinders are preferably extended downwardly and rearwardly beneath the air-foil to discharge the exhaust gases rearwardly beneath the same (see Figures 1, 3, 4 and 5).

The propeller 22 has its shaft 23 paralleling the axes of the cylinders 8 and connected by suitable gearing 26 with the crank shafts 13. The propeller shaft 23 passes through a suitable bearing or support 24.

When a single propeller is used I prefer to arrange the engine cylinders in two groups (see Figure 7) each group having a separate crank shaft 13 and a bevelled gear 26 to mesh with a similar bevelled gear on the shaft 23. When two propellers are used there may be two separate engine units employed (see Figure 6), these being geared to the propeller shaft in a manner similar to that in Figure 7.

The air-foil is provided with one or more suitable air intakes or openings 27 through which air may be taken to the carburetors (not shown) of the engine, it being understood that the construction of the engine aside from having the cylinders in line horizontally may be of any approved design.

It is to be noted that in carrying out my invention the diameters of the engine cylinders are less than the maximum depth or thickness of the air-foil so that the finned ends 14 of the cylinders may not oppose any more head resistance than that normally opposed by the leading edge of the air-foil.

Furthermore by arranging the cylinders in the manner shown the maximum cooling effect can be obtained, for the reason that the cylinders are always in the direction of flight and the air flows around and between the cylinders passing the full length of the working chamber of the cylinders and then be deflected by the leading edge of the air-foil.

Where two propellers are used the cylinders are preferably arranged in the space between the propellers and the propeller shafts are geared to the opposite ends of the crank shaft. By this arrangement the balance of the airplane is not disturbed. Because the propellers turn in opposite directions, the airplane is easier to balance.

Since all of the engines are lined up in the same horizontal plane with their axes passing through the leading edge of the air-foil about midway of the thickness of the air-foil the normal air-flow over and below the air-foil is not disturbed in flight.

While I have shown my invention as applied to the smaller types of airplanes, it is obvious that it may also be applied to those employing auxiliary wings and auxiliary engines. Since the same engine arrangement may be supplied to the auxiliary wings as to the main wings a detailed illustration thereof is thought to be unnecessary.

Other advantages of the invention will be clear to those skilled in the art.

It is also obvious that various modifications and mechanical changes in the details of construction etc. may be made without departing from the invention. It should, of course, be understood that in designing the airplane for use with my invention the wing surfaces carrying the motors are preferably detachably secured to the framework so that easy access may be had to the motors for the purpose of adjustment and repair, but such details are details of mechanical skill and a detailed disclosure thereof in the drawings of this application are believed to be unnecessary.

It should also be understood that the number of cylinders used may be varied depending upon the design of the airplane and the power which it is desired to apply to the machine for propelling purposes.

The advantages of all the motor constructions and engine mounting arrangements previously set forth, will at once be apparent. In all of the motors, it may be noted that the axis of each cylinder is parallel to the line of flight. This condition allows an efficiency of cooling heretofore not attained. This is true since each cylinder gets the full blast and force of the air stream created during flight as well as in some instances the slip stream of the propeller. Because of its position, the air flow circulates around the entire surface of each cylinder so as to cause an even cooling effect at each point on the cylinder. It may also be noted that the cylinder heads are in the direct line of the air flow and since these parts of the motor are those which become most heated it will be well appreciated that the positioning of the motor as described tends for a high degree of efficiency in cooling.

Not only is the cooling of the motor benefited, but there is in all of the constructions a motor arrangement permitting a substantial decrease in the parasitic resistance of the whole plane. In the use of the straight line motor, this is attained by reason of its horizontal rather than vertical mounting which permits the motor to be carried within the wing of the airplane. Where a motor is mounted in the fuselage of the plane, the cylinder grouping parallel to a central axis likewise permits a decrease of parasitic resistance. Through such constructions, the only parts of the motor offering resistance to the air flow are those portions of the cylinders and propeller shaft bearings extending externally of the airplane. Needless to say, the resistance area presented by these parts is of a decidedly small amount.

Through the use of the motor mounting arrangements such as those set forth, it will be noted that the pilot's field of vision is in no way obstructed. By reason of this the ease with which the pilot may handle the plane and conduct maneuvers is greatly enhanced.

Insofar as this application contains matter in common with my application filed December 11, 1931, Serial No. 580,433, the present application is a continuation thereof in part.

What I claim is:

1. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, and a propeller driven by said engine.

2. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, and a propeller driven by said engine, said engine having exhaust pipes extending from its cylinders beneath the air-foil to increase the lift.

3. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, a propeller driven by said engine, said air-foil having an opening on its under side and said crank case having a lubricant reservoir projecting into said opening so as to be exposed to the air stream beneath the airfoil.

4. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, a propeller driven by said engine, said engine having exhaust pipes extending from its cylinders beneath the air-foil, said air-foil having an opening on its under side and said crank case having a lubricant reservoir projecting into said opening so as to be exposed to the air stream beneath the airfoil.

5. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of an air-foil and extending behind the spar and the working cylinders projected forwardly from the spar and through the leading edge of the air-foil to the outside thereof, a propeller driven by said engine, said air-foil having an opening on its under side and said crank case having a lubricant reservoir projecting into said opening so as to be exposed to the air stream beneath the airfoil, the exposed parts of said crank case having cooling fins projecting below the air-foil in the lower air stream.

6. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar through the leading edge of the air-foil to the outside thereof, a propeller driven by said engine, said engine exhaust pipes extending from its cylinders beneath the air-foil, said air-foil having an opening on its under side and said crank case having a lubricant reservoir projecting into said opening so as to be exposed to the air stream beneath the air-foil, the exposed parts of said crank case having cooling fins projecting below the air-foil in the lower air stream.

7. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, a propeller driven by said engine, said air-foil having an opening on its under side and said crank case having a lubricant reservoir projecting into said opening so as to be exposed to the air stream beneath the air-foil, said projecting portion of the crank case serving as a closure for the opening to which it is exposed, the exposed parts of said crank case having cooling fins projecting below the air-foil in the lower air stream.

8. In an airplane having a wing with front spar and a leading edge, the combination with the front spar and the leading edge, of an air cooled internal combustion engine having a crank case and a set of working cylinders, the latter being arranged in a horizontal row side by side with their axes parallel in the direction of flight, said crank case being mounted on and projected rearwardly from said spar and located within the wing, said working cylinders projecting forwardly from the spar through the leading edge of the wing and provided with cooling fins on their exposed portions, and a propeller arranged as a unit with said engine and operated thereby, said internal combustion engine being carried in a substantially vertically centralized opening in said front spar.

9. In an airplane having a wing with front spar and a leading edge, the combination with the front spar and the leading edge, of an air cooled internal combustion engine having a crank case and a set of working cylinders, the latter being arranged in a horizontal row side by side with their axes parallel in the direction of flight, said crank case being mounted on and projected rearwardly from said spar and located within the wing, said working cylinders projecting forwardly from the spar through the leading edge of the wing and provided with cooling fins on their exposed portions, a propeller arranged as a unit with said engine and operated thereby, said internal combustion engine being carried in substantially vertically centralized opening in said front spar, the crank case of said engine having an oil reservoir partly exposed beneath the wing to the lower air stream.

10. In an airplane having a wing with a front spar and a leading edge, the combination with the front spar and the leading edge, of an air cooled internal combustion engine having a crank case and a set of working cylinders, the latter being arranged in a horizontal row side by side with their axes parallel in the direction of flight, said crank case being mounted on and projected rearwardly from said spar and located within the wing, said working cylinders projecting forwardly from the spar through the leading edge of the wing and provided with cooling fins on their exposed portions, and a propeller arranged as a unit with said engine and operated thereby, said internal combustion engine being carried in a substantially vertically centralized opening in said front spar, the crank case of said engine having an oil reservoir partly exposed beneath the wing to the lower air stream, and having cooling fins on said reservoir extending in the direction of flight.

11. In an airplane having a wing, a power plant carried by the wing and comprising a self-contained unit composed of an air cooled internal combustion engine and a propeller driven from the crank shaft of said engine, said engine including a set of horizontally disposed cylinders mounted in the wing and projecting through substantially vertically centralized apertures in the leading edge of the wing with the cylinder heads forward and the axes of the cylinder lying parallel to one another in a horizontal plane parallel to the line of flight, said internal combustion engine also including a crank case disposed within the wing, said cylinders having exhaust pipes leading therefrom to discharge beneath the wing parallel to the air stream, said crank case having an oil reservoir exposed beneath the wing to atmosphere and provided with fins for air cooling purposes.

12. In an airplane, the combination with the front spar of the air-foil and the leading edge of the air-foil, of an air cooled internal combustion engine including a horizontal row of air cooled cylinders, a crank case, crank shafts and pistons with connecting rods, said spar having a substantially vertically centralized opening through which said engine projects, means for securing said engine to said front spar with the crank case located within the body of the air-foil and extending behind the spar and the working cylinders projected forwardly from the spar and through the leading edge of the air-foil to the outside thereof, a propeller driven by said engine, said air-foil having an opening on its under side and said crank case having a lubricant reservoir projecting into said opening so as to be exposed to the air stream beneath the air-foil, said projecting portion of the crank case serving as a closure for the opening in which it is exposed.

EDWARD A. MARSKI.